No. 892,117. PATENTED JUNE 30, 1908.
T. C. X. A. BERGET.
MEANS FOR REGULATING THE TEMPERATURE IN VEHICLES.
APPLICATION FILED FEB. 21, 1906.
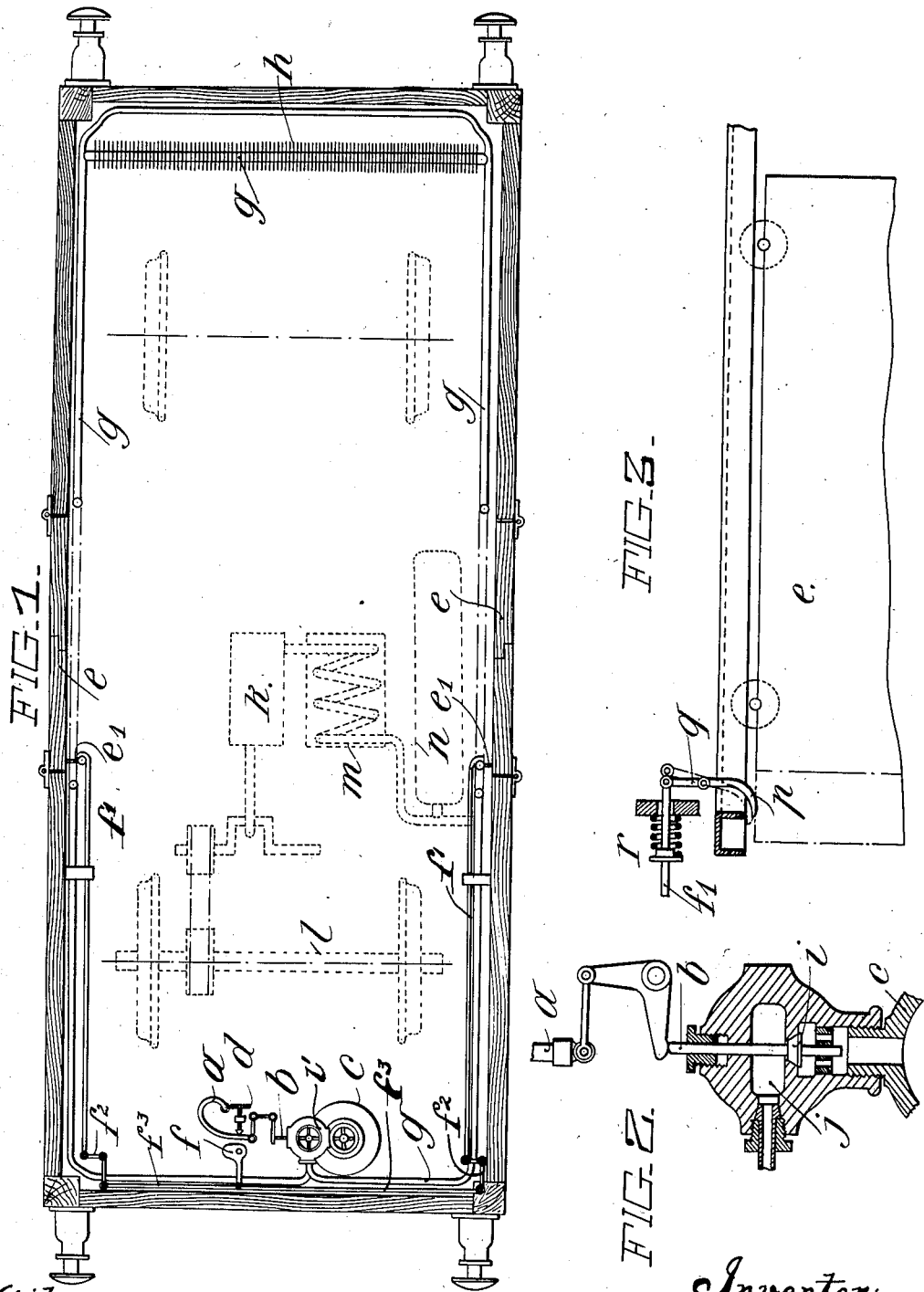
Witnesses:
Inventor:
Thomas Claude Xavier Alphonse Berget
by Georgii & Massie
his attorneys

UNITED STATES PATENT OFFICE.

THOMAS CLAUDE XAVIER ALPHONSE BERGET, OF PARIS, FRANCE.

MEANS FOR REGULATING THE TEMPERATURE IN VEHICLES.

No. 892,117.      Specification of Letters Patent.      Patented June 30, 1908.

Application filed February 21, 1906. Serial No. 302,320.

*To all whom it may concern:*

Be it known that I, THOMAS CLAUDE XAVIER ALPHONSE BERGET, residing at Paris, in the Republic of France, have invented a new and useful Improvement in Means for Regulating the Temperature in Vehicles, which improvement is fully set forth in the following specification.

This invention has for its object an arrangement for suitably lowering and maintaining the temperature constant in wagons intended for the transport of vegetable and animal products such arrangement being of the class in which a thermostat is used for controlling the supply of a refrigerating agent. For this purpose liquid carbonic acid or other liquefied gas is expanded and its latent heat of vaporization utilized. The arrangements employed for this purpose differ according as the liquefied gas is used simultaneously as the producer and regulator of cold, or as regulator only for maintaining a temperature already previously lowered. In this latter case, the initial reduction of temperature is produced either by means of ice or by the expansion of compressed air by means of a compression and expansion apparatus, driven by the movement of the vehicle itself. In both cases the essential part is a regulating thermostat which controls the expansion valve of a liquid carbonic acid reservoir in such a manner as to open it when the temperature rises above a limit selected for the proper preservation of the goods transported, and on the other hand to maintain it closed so long as the temperature remains below this limit.

The annexed drawing shows diagrammatically an arrangement of railway car provided with my improved means for regulating the temperature.

In this drawing, Figure 1 is a horizontal plan of the car interior with the invention installed; Fig. 2 is a detail of the expansion valve; and Fig. 3 is a fragmentary view of a modification.

For example in the arrangement illustrated, a flexible hollow spiral thermostat $a$ in the shape of a metal manometer containing a very volatile liquid is employed. The deformation of the elastic spiral under the influence of the dilatation of the liquid and of the increase of its vapor tension, causes a steel rod $b$ to be pushed inwards and control a valve $i$ forming the outlet orifice from the reservoir $c$ of the liquefied gas, in such a manner that this valve opens to allow a portion of the gas to escape. When, on the contrary, the temperature falls and attains the limit fixed, the thermometric spiral $a$ abuts against a stop $d$, which can be regulated, and the gas expansion valve closes, and as the gas no longer passes out, the production of cold ceases. A special arrangement is moreover provided for avoiding the loss of gas while loading or unloading the wagon, at which periods the doors are open and the inside air is at the prevailing outside temperature. Is is evident that, in this case, the outflow of the liquefied gas would only wastefully produce cold, for the thermometric spiral, marking 25° C. for example, will maintain the carbonic acid reservoir open. This is obviated in a simple manner by automatically confining the thermostat. For this purpose the car door $e$ in opening controls a catch $f$ which confines the thermometric spiral $a$ or permits it to turn slightly upon itself in such a manner that it is no longer opposite the outlet valve. The spiral $a$ is fixed at its inner curved end and is connected at the other end by a link with one arm of the angle-lever, which bears with its second arm upon the rod $b$. The straightening out of the spiral under the influence of a rising temperature, when released by the stop $f$, therefore pulls by means of the link to the left and actuates the angle-lever to depress the rod $b$. This catch $f$ is only disengaged by the closing of the door, from which time the production of cold is usefully efficacious for refrigerating the air in the interior.

As shown in the drawings, the catch $f$ is actuated by the door $e$ by means of rods $f^1, f^3$ and bell crank levers $f^2$. The means through which the rods $f^1$ are actuated by the doors $e$ differ of course according to the arrangement of the doors themselves and must in any case be such that they may be actuated whatever door is opened. Any appropriate means may be used for that purpose and such means do not, *per se*, form a part of my invention.

In Figs. 1 and 2, which show a car with hinged doors (such doors effecting as a rule a tighter closure than those of other types) the rod $f^1$ is actuated by an arm $e^1$ on the door $e$.

In the case of rolling doors, as shown in Fig. 3, the top of the door $e$ will actuate a cam shaped arm $p$ of a lever $q$ linked to the rod $f^1$. This arrangement might also be used to actuate a cock or valve placed on an appropriate portion of the pipes $g$ mentioned hereafter. Such an arrangement of sliding or rolling doors has the advantage of furnishing simple means for holding the thermostat locked, since the cam-shaped arm $p$ of lever $q$ will be held in its deviated position by the top of the door as long as the same is open and will be brought back to its normal position by its spring $r$.

The expanded air traverses, on passing out of the expansion valve $i$, a system of copper tubes $g$, with which the sides of the car are covered and which are preferably provided, with fins for increasing the refrigerating surface, after which it may either, in cases where the goods are not affected by carbonic acid, escape freely into the atmosphere of the car which it causes to circulate or may be directed outside. When the carbonic acid is employed alone for the production and regulation of the cold, supposing for example that the temperature in the car should be maintained at 8° C., which is about that necessary to preserve fruit and early produce, this arrangement works as follows: So soon as the wagon is closed the inside temperature, say 25° C., causes the thermometric spiral, released by the closing of the door, to straighten out and open the outlet orifice $j$ from the reservoir of liquefied gas. So soon as a portion of the gas escapes passing through the expansion valve and the system of copper tubes, the expansion of this gas will lower the temperature of the sides and the atmosphere in the car will become cooler. When the inside temperature has attained the limit fixed 8° C. for example, the thermometric spiral closes the gas expansion valve and the production of cold ceases, but is automatically continued so soon as, at the end of some time, the temperature again rises above 8°. It will be seen that with such an arrangement the employment of carbonic acid suffices for all cases. It may if desired be replaced by other suitable liquefied or highly compressed gases. This arrangement may be employed for maintaining a given temperature previously formed by other suitable means, such as by the employment of ice or by an apparatus for the compression and expansion of air driven by the movement of the vehicle. This latter apparatus which may, as shown in dotted lines in Fig. 1, consist of an air compressor $k$ driven from the axle $l$, a refrigerating coil $m$ and a reservoir $n$ connected to the tubes $g$, performs the cooling operation well when traveling, but ceases to work when at rest, the regulating thermostat then comes into action by reason of the rising of the temperature in the car and maintains the atmosphere at the desired temperature.

Having thus fully described my invention, what I claim as new and desire to secure by Letters Patent is:—

1. In a refrigerating compartment, the combination, of a reservoir for liquefied gas, an expansion valve serving as an outlet therefrom, a thermostat controlling said valve to maintain the temperature in the compartment within certain limits, and means to render said thermostat inoperative when the door to the compartment is open.

2. In a refrigerating compartment, the combination, of a reservoir for liquefied gas, an expansion valve serving as an outlet therefrom, and a thermostat formed as a hollow curved arm containing an expansible fluid and acting directly upon said valve to open and close the same to maintain an equable temperature in the compartment, a catch arranged adjacent the thermostat, and a connection between the catch and the door to the compartment to throw the catch to render the thermostat inoperative when the door is open.

3. In a refrigerating compartment, the combination, of a reservoir for liquefied carbonic acid gas, refrigerating coils, an expansion valve connecting the reservoir and coils, and a thermostat formed as a hollow curved arm containing an expansible fluid and acting directly upon said valve to open and close the same to maintain an equable temperature in the compartment, a catch arranged adjacent the thermostat, and a connection between the catch and the door to the compartment to throw the catch to render the thermostat inoperative when the door is open.

In testimony whereof I have signed this specification in the presence of subscribing witnesses.

THOMAS CLAUDE XAVIER
ALPHONSE BERGET.

Witnesses:
T. SOULÉ,
LAUD FRÉDÉRIC,
HANSON C. COXE.